J. D. FORRER.
COIL FOR DYNAMO ELECTRIC MACHINES.
APPLICATION FILED JULY 24, 1908.

957,876.

Patented May 17, 1910.

2 SHEETS—SHEET 1.

WITNESSES:
Fred H. Miller
R. J. Dearborn

INVENTOR
Joseph D. Forrer
BY
Wesley Sloan
ATTORNEY

J. D. FORRER.
COIL FOR DYNAMO ELECTRIC MACHINES.
APPLICATION FILED JULY 24, 1908.
957,876.
Patented May 17, 1910.
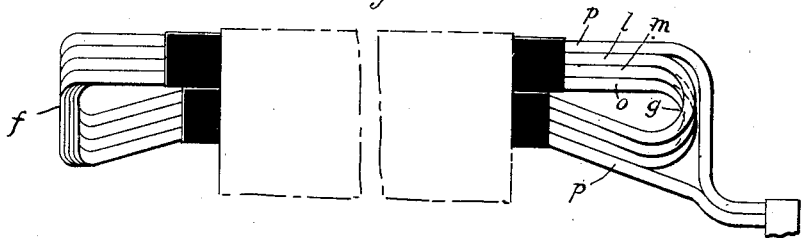
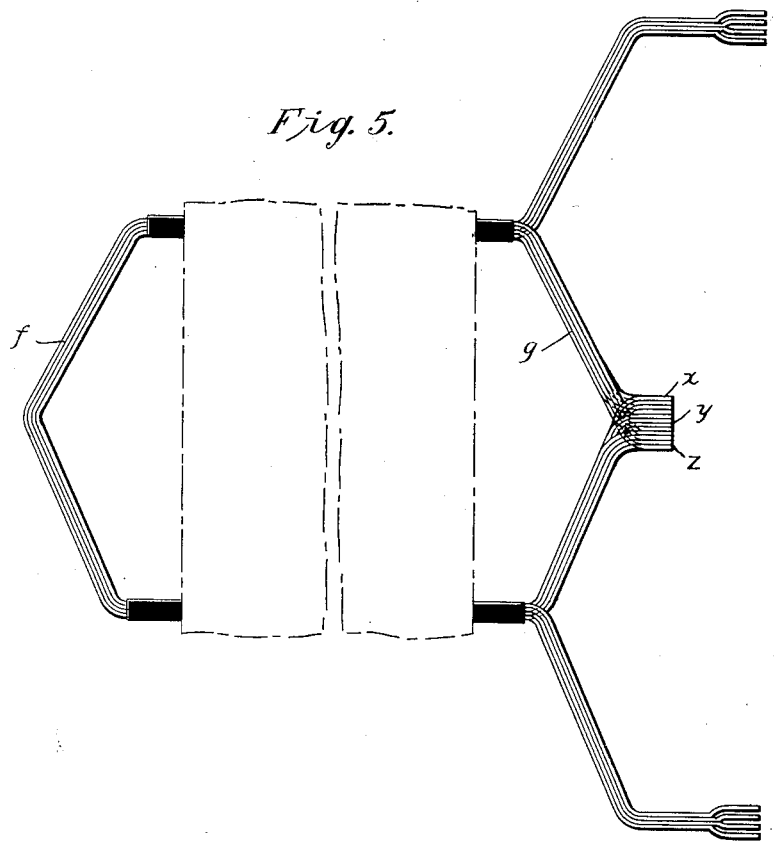

UNITED STATES PATENT OFFICE.

JOSEPH D. FORRER, OF PITTSBURG, PENNSYLVANIA, ASSIGNOR, BY MESNE ASSIGNMENTS, TO WESTINGHOUSE ELECTRIC & MANUFACTURING COMPANY, OF EAST PITTSBURG, PENNSYLVANIA, A CORPORATION OF PENNSYLVANIA.

COIL FOR DYNAMO-ELECTRIC MACHINES.

957,876.  Specification of Letters Patent.  Patented May 17, 1910.

Application filed July 24, 1908. Serial No. 445,280.

*To all whom it may concern:*

Be it known that I, JOSEPH D. FORRER, a citizen of the United States, and a resident of Pittsburg, in the county of Allegheny and State of Pennsylvania, have invented a new and useful Improvement in Coils for Dynamo-Electric Machines, of which the following is a specification.

My invention relates to coils for dynamo-electric machines and it has special reference to coils of the so-called diamond type which are adapted to form parts of the wave windings of commutator type machines.

The object of my invention is to provide a coil of the class above indicated that shall be simple in construction, relatively easy to wind and specially economical of space.

When direct current electric motors and generators, or other dynamo-electric machines having commutators, are provided with complete wave windings having coils of the diamond type, the end-connecting portions of the assembled coils are close together and form two layers, one within the other. In the prior art, the coil leads usually were so related to the remainder of the coil that at least one of them was necessarily brought radially inward or outward from the inside of the layers referred to above. The leads were then bent in opposite directions and carried to the commutator bars along any suitable lines following the general direction of the axis of the machine.

According to my present invention, the short radial portions of the leads which were usually crowded between adjacent coils are entirely avoided, the leads being so brought out as to form a continuation of the innermost and outermost conductors of the coils so that they may extend directly to the proper commutator bars and at the same time the usual short radius bends in the coil are reduced to a minimum.

Figure 1:
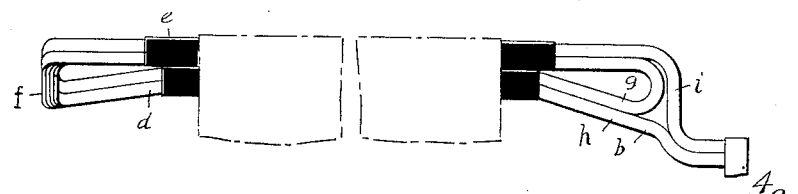
Figure 2:
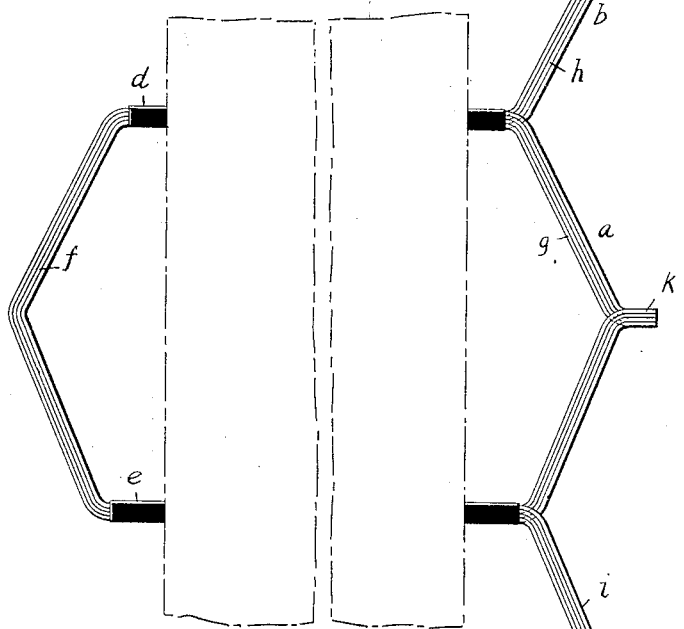
Figure 3:
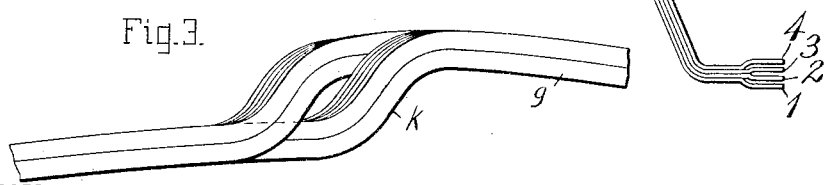

Figure 1 of the accompanying drawings is a side elevation of a complete coil assembled in the core of a dynamo-electric machine in the usual manner, the core being indicated by broken lines. Fig. 2 is a plan view of coil and core portion shown in Fig. 1. Fig. 3 is a detail view of adjacent portions of the ends of two coils. Figs. 4 and 5 are views similar to Figs. 1 and 2 of a coil having four turns or convolutions and wound in accordance with my invention.

Referring to Figs. 1, 2, and 3 of the drawings, the coil here illustrated comprises a complete or closed multi-strand turn $a$ and an open multi-strand turn $b$. The strands $c$ of which the coil is wound are side by side and the turns of the coil are one above another. The general form of the coil is that of the well known diamond type having parallel straight portions $d$ and $e$ which are located in the usual core slots of a dynamo-electric machine and substantially V-shaped end connecting portions $f$ and $g$ which join the extremities of the straight portions $d$ and $e$ that project from the core slots. The coil leads $h$ and $i$ project from the straight portions $d$ and $e$ and at the same end of the core of the machine, lead $h$ forming a continuation of the undermost turn of the straight portion $d$ and the lead $i$ forming a continuation of the uppermost turn of the straight portion $e$. These leads may, of course, extend to the commutator of the machine in any suitable manner but usually form, in a wave type of winding, angles with the straight portions of the coil which correspond to those of the adjacent portions of the end connector.

Referring specially to Fig. 2 of the drawings, it will be understood by those skilled in the art that the outermost strand 1 in the lead $i$ must come out as the innermost strand in the lead $h$, the strands 2 and 3 adjacent to the strand 1 in the lead $i$ must still bear the same relation to the strand 1 in the lead $h$ and the innermost strand 4 of lead $i$ must be the outermost strand of lead $h$. In order to accomplish this result, it has hitherto been usual to so bend the turns of the coils at the middle points of the end connecting portions $f$ and $g$ as to turn the strands over three times in the two convolutions of which the coil is composed, thereby forming the usual off-set bends and finally bringing out the leads in the desired relation.

I have considerably simplified the coils of the prior art in such manner that the objectionable bends in the leads, to which reference has already been made, are avoided. The end connecting portion $g$ of my improved coil is provided with a bend $k$ which I term, for convenience, an off-set bend in which the strands are turned over so that the strand 1, which is on the outside in the lead $i$, in straight portion $e$, in the end connecting portion $f$ and in the straight portion $d$, is here changed from the outside to the inside and, in the latter position, extends again through straight portion $e$, the end connecting portion $f$, and the straight portion $d$ to the lead $h$. In a similar manner, the other strands of the coil are so bent as to maintain their proper relation. In the end connecting portion $f$, however, the position of the strands is unchanged and only a slight bend is necessary, as shown in Fig. 3, in order that a plurality of coils may be so wound, in the usual manner, as to fit together into a small space at the ends of the core member. The distance beyond the core member necessarily occupied by the end connecting portions $f$ is materially reduced by the use of my improved coil.

Round-wire coils may advantageously be formed in accordance with my invention, but the advantages of this method are more apparent in coils which are formed of strap or square-wire conductors, since it is relatively difficult to make short radius edgewise bends in strap conductors. Thus it is possible to secure the well known advantages of the strap winding, which is more economical of space in the core slots, with a minimum number of undesirable bends.

Referring to Figs. 4 and 5 the coil here illustrated comprises three complete or closed turns $l$, $m$, and $o$ corresponding to turn $a$ in the other figures, and one open turn $p$ that corresponds to the turn $b$. The advantages of my invention when applied to a four turn coil are specially apparent over the most improved coils of the prior art for the reason that four turn coils of this general type, arranged to avoid the objectional feature of bending one of the leads radially to bring it out from between the turns, would comprise four off-set bends at one end and three at the other which would practically bar its use. On the other hand, according to my invention, four turn coils may be readily constructed (see Fig. 5) having only three off-set bends $x$, $y$, and $z$ which are not objectionable. The end connecting portion $f$ in the four turn coil is provided with a slight bend, as in the two turn coil, in order that a plurality of coils may be fitted together. By turning the conductors over three times in the four turns the strands bear the proper relation to each other in the leads.

It will, of course, be understood that the form of conductor is immaterial to my invention and that variations in detail may be affected within its scope, consequently, I desire that only such limitations shall be imposed as are indicated in the appended claims.

I claim as my invention:

1. A coil for dynamo-electric machines comprising a plurality of multi-strand turns located one above another, the strands of said turns being located side by side and reversed in position once in each closed turn of the coil.

2. A wave winding coil for dynamo-electric machines comprising one complete and one open multi-strand turn, the closed turn of which has an off-set bend and the strands being reversed in position at the off-set bend.

3. A coil for dynamo-electric machines comprising a plurality of multi-strand turns having substantially parallel straight portions, V-shaped end connecting portions and an off-set bend in one of the said end connecting portions, the position of the strands being reversed on opposite sides of said off-set bend.

4. A coil comprising a plurality of multi-strand turns having substantially parallel straight portions adapted to be included in the core slots of a dynamo-electric machine, V-shaped end connecting portions and an off-set bend in one of the said end connecting portions, the relative positions of the strands being the same throughout the coil except that they are disposed in reverse order at opposite sides of the off-set bend.

In testimony whereof, I have hereunto subscribed my name this 14th day of July, 1908.

J. D. FORRER.

Witnesses:
H. E. DYCLIE,
BIRNEY HINES.